United States Patent
Addiego et al.

(10) Patent No.: US 7,932,200 B2
(45) Date of Patent: *Apr. 26, 2011

(54) REDUCED STRAIN REFRACTORY CERAMIC COMPOSITE AND METHOD OF MAKING

(75) Inventors: William Peter Addiego, Big Flats, NY (US); Christopher Raymond Glose, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/815,808

(22) Filed: Jun. 15, 2010

(65) Prior Publication Data

US 2010/0248934 A1    Sep. 30, 2010

Related U.S. Application Data

(62) Division of application No. 12/692,220, filed on Jan. 22, 2010, which is a division of application No. 11/800,584, filed on May 7, 2007, now Pat. No. 7,704,905.

(51) Int. Cl.
  *C04B 35/482* (2006.01)
(52) U.S. Cl. .................................................. 501/106
(58) Field of Classification Search .................... 501/106
  See application file for complete search history.

(56) References Cited

U.S. PATENT DOCUMENTS

| | | | |
|---|---|---|---|
| 3,338,696 A * | 8/1967 | Dockerty | 65/145 |
| 3,437,470 A * | 4/1969 | Overman | 65/195 |
| 3,682,609 A * | 8/1972 | Dockerty | 65/83 |
| 4,152,166 A * | 5/1979 | Rogers | 501/87 |
| 4,298,385 A * | 11/1981 | Claussen et al. | 501/105 |
| 5,124,287 A * | 6/1992 | Wehrenberg et al. | 501/106 |
| 5,407,873 A * | 4/1995 | Goerenz et al. | 501/106 |
| 6,121,177 A * | 9/2000 | Guigonis et al. | 501/105 |
| 6,974,786 B2 * | 12/2005 | Helfinstine et al. | 501/106 |
| 7,238,635 B2 * | 7/2007 | Ames et al. | 501/106 |
| 2005/0130830 A1* | 6/2005 | Ames et al. | 501/103 |
| 2008/0196449 A1* | 8/2008 | Addiego et al. | 65/17.3 |

FOREIGN PATENT DOCUMENTS

| | | |
|---|---|---|
| DE | 155896 | 7/1982 |
| JP | 61158874 | 7/1986 |
| JP | 63252971 | 10/1988 |

OTHER PUBLICATIONS

M. Awaad et al, ; "Sintering of zircon: the role of additives"; British Ceramics Transactions, 2003, vol. 102, No. 2; pp. 69-72.

* cited by examiner

*Primary Examiner* — Karl E Group
(74) *Attorney, Agent, or Firm* — Bruce P. Watson

(57) ABSTRACT

A composition is disclosed comprising a fine zircon component having a median particle size of less than 5 μm, a medium zircon component having a median particle size of from 5 μm to 15 μm, and a sintering aid, wherein the composition, after firing, has a strain rate of less than about $1\times10^{-6}$/hr. A method for making a green body comprising contacting a fine zircon component having a median particle size of less than 5 μm, a medium zircon component having a median particle size of from 5 μm to 15 μm, and a sintering aid, and then forming the mixture into a desired shape is disclosed.

18 Claims, 1 Drawing Sheet

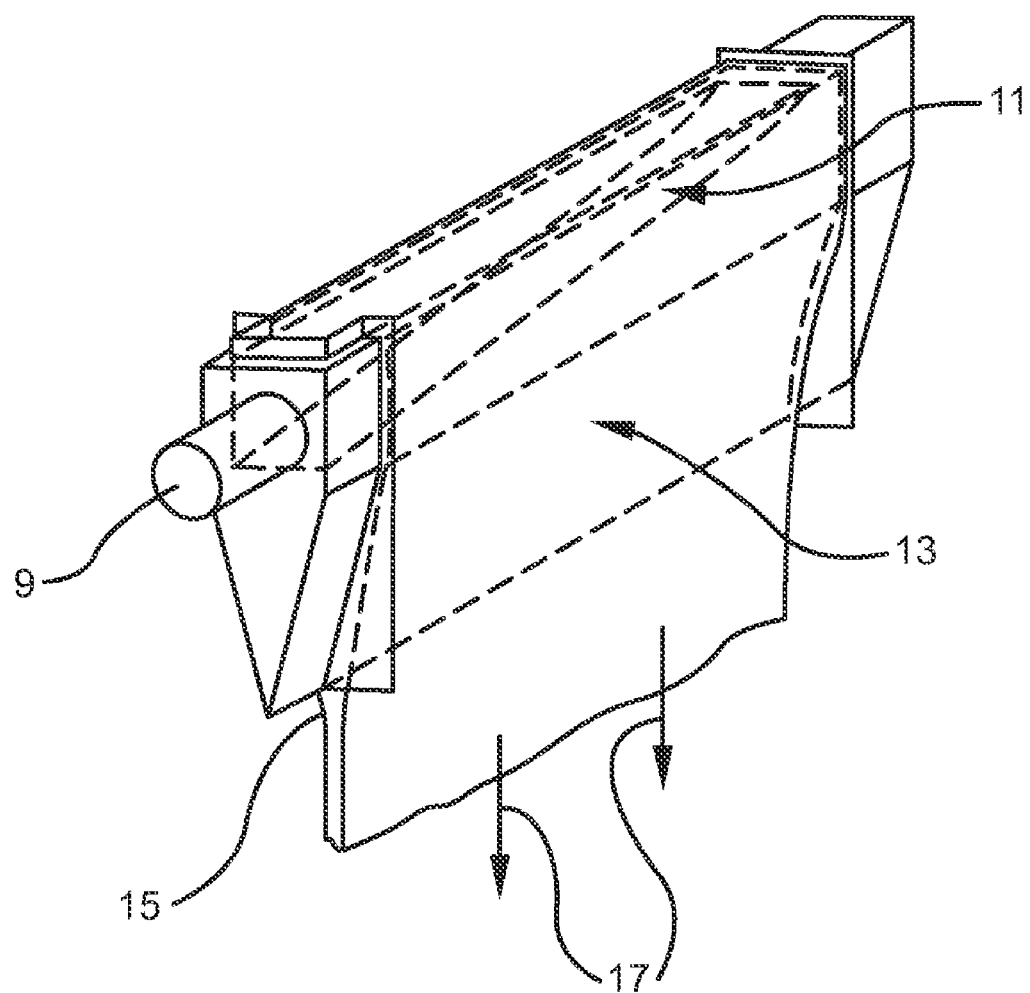

REDUCED STRAIN REFRACTORY CERAMIC COMPOSITE AND METHOD OF MAKING

CROSS-REFERENCE TO RELATED APPLICATIONS

This application is a divisional application of U.S. application Ser. No. 12/692,220, filed Jan. 22, 2010, titled REDUCED STRAIN REFRACTORY CERAMIC COMPOSITE AND METHOD OF MAKING; which is a divisional application of U.S. application Ser. No. 11/800,584, filed May 7, 2007, now U.S. Pat. No. 7,704,905, titled REDUCED STRAIN REFRACTORY CERAMIC COMPOSITE AND METHOD OF MAKING. This Applicant claims the benefit of priority under 35 US.C. §120 & 121 of the above-identified applications.

BACKGROUND OF THE INVENTION

1. Field of the Invention

The present invention relates to refractory ceramic materials and specifically, to the use of such materials in the manufacture of sheet glass by the fusion process.

2. Technical Background

The fusion process is one of the basic techniques used to produce sheet glass and can produce sheet glass having surfaces with superior flatness and smoothness relative to sheet glass produced by alternative processes, such as for example, the float and slot drawn processes. As a result, the fusion process has found advantageous use in the production of the glass substrates used in the manufacture of light emitting displays, such as liquid crystal displays (LCDs).

The fusion process, specifically, the overflow downdraw fusion process, includes a supply pipe which provides molten glass to a collection trough formed in a refractory body known as an isopipe. During the overflow downdraw fusion process, molten glass passes from the supply pipe to the trough and then overflows the top of the trough on both sides, thus forming two sheets of glass that flow downward and then inward along the outer surfaces of the isopipe. The two sheets meet at the bottom or root of the isopipe, where they fuse together into a single sheet. The single sheet is then fed to drawing equipment that controls the thickness of the sheet by the rate at which the sheet is drawn away from the root. The drawing equipment is located well downstream of the root so that the single sheet has cooled and become rigid before coming into contact with the equipment.

The outer surfaces of the final glass sheet do not contact any part of the outside surface of the isopipe during any part of the process. Rather, these surfaces only see the ambient atmosphere. The inner surfaces of the two half sheets which form the final sheet do contact the isopipe, but those inner surfaces fuse together at the root of the isopipe and are thus buried in the body of the final sheet. In this way, the superior properties of the outer surfaces of the final sheet are achieved.

The dimensional stability of an isopipe during the glass forming process can affect the overall success of the manufacturing process, as well as the properties of the manufactured glass sheet. In the overflow downdraw fusion process, an isopipe can be subjected to temperatures of about 1,000° C. While exposed to these temperatures, an isopipe must support its own weight, the weight of the molten glass contained within the isopipe and overflowing its sides, and at least some tensional force that is transferred back to the isopipe through the fused glass as it is being drawn.

Commercial and market factors require a continuous increase in the size of light emitting displays and thus, the size of sheet glass. Depending on the width of the sheet glass to be produced, an isopipe can have an unsupported length of about 1.5 meters or more.

To withstand these demanding conditions, isopipes have conventionally been manufactured from isostatically pressed blocks of refractory material (hence the name "iso-pipe"). In particular, isostatically pressed zircon refractories have been used to form isopipes for the fusion process. Conventional zircon refractories are comprised of $ZrO_2$ and $SiO_2$, or equivalently $ZrSiO_4$. Even with such high performance materials, isopipe materials can creep, resulting in dimensional changes which limit their useful life. In particular, isopipes exhibit sag such that the middle of the unsupported length of the pipe drops below the height of its outer supported ends.

Thus, there is a need to address dimensional stability and other shortcomings associated with conventional isopipes and methods for manufacturing sheet glass. These needs and other needs are satisfied by the composition and methods of the present invention.

SUMMARY OF THE INVENTION

The present invention relates to a refractory ceramic material that can, in one aspect, be used in the manufacture of sheet glass by, for example, the overflow downdraw fusion process, and specifically to an isopipe designed to control sag during use. The present invention addresses at least a portion of the problems described above through the use of a novel refractory ceramic composition and method of making.

In a first aspect, the present invention provides a composition comprising a fine zircon component having a median particle size of less than 5 µm, a medium zircon component having a median particle size of from 5 µm to 15 µm, and a sintering aid, wherein the composition, after firing, has a strain rate of less than about $1 \times 10^{-6}$/hr.

In a second aspect, the present invention provides a method of making a green body comprising contacting a fine zircon component having a median particle size of less than 5 µm, a medium zircon component having a median particle size of from 5 µm to 15 µm, and a sintering aid to form a mixture; and then forming the mixture into a desired shape.

In a third aspect, the present invention provides an article made by the method described above.

Additional aspects and advantages of the invention will be set forth, in part, in the detailed description, FIGURE, and any claims which follow, and in part will be derived from the detailed description or can be learned by practice of the invention. The advantages described below will be realized and attained by means of the elements and combinations particularly pointed out in the appended claims. It is to be understood that both the foregoing general description and the following detailed description are exemplary and explanatory only and are not restrictive of the invention as disclosed.

BRIEF DESCRIPTION OF THE DRAWINGS

The accompanying drawing, which is incorporated in and constitutes a part of this specification, illustrates certain aspects of the present invention and together with the description, serves to explain, without limitation, the principles of the invention.

The FIGURE is a schematic diagram illustrating a representative construction for an isopipe for use in an overflow downdraw fusion process for making sheet glass, in accordance with one aspect of the present invention.

DETAILED DESCRIPTION OF THE INVENTION

The present invention can be understood more readily by reference to the following detailed description, drawings, examples, and claims, and their previous and following description. However, before the present compositions, articles, devices, and methods are disclosed and described, it is to be understood that this invention is not limited to the specific compositions, articles, devices, and methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its currently known aspects. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

Disclosed are materials, compounds, compositions, and components that can be used for, can be used in conjunction with, can be used in preparation for, or are products of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. Thus, if a class of substituents A, B, and C are disclosed as well as a class of substituents D, E, and F and an example of a combination aspect, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these are also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to any components of the compositions and steps in methods of making and using the disclosed compositions. Thus, if there are a variety of additional steps that can be performed it is understood that each of these additional steps can be performed with any specific aspect or combination of aspects of the disclosed methods, and that each such combination is specifically contemplated and should be considered disclosed.

In this specification and in the claims which follow, reference will be made to a number of terms which shall be defined to have the following meanings:

As used herein, the singular forms "a," "an" and "the" include plural referents unless the context clearly dictates otherwise. Thus, for example, reference to a "component" includes aspects having two or more such components, unless the context clearly indicates otherwise.

"Optional" or "optionally" means that the subsequently described event or circumstance can or cannot occur, and that the description includes instances where the event or circumstance occurs and instances where it does not. For example, the phrase "optional component" means that the component can or can not be present and that the description includes both aspects of the invention including and excluding the component.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, a "wt. %" or "weight percent" or "percent by weight" of a component, unless specifically stated to the contrary, refers to the ratio of the weight of the component to the total weight of the composition in which the component is included, expressed as a percentage.

As used herein, the term "isopipe" refers to any sheet forming delivery system used in a fusion process which produces flat glass wherein at least a part of the delivery system comes into contact with the glass just prior to fusion, irrespective of the configuration or the number of components making up the delivery system.

As used herein, the term "pore" or "pores" refers to a vacancy or void within and/or between grains of a refractory material. The term "pore" is intended to describe vacancies and/or voids of varying sizes, but is not intended to describe inter-atomic spaces within a material.

As used herein, the term "strain" refers to the deformation of a material caused by a stress.

The following US patents and published applications describe various compositions and methods for manufacturing sheet glass, and they are hereby incorporated by reference in their entirety and for the specific purpose of disclosing materials and methods relating to the formation of refractory ceramics, isopipes, and the manufacture of sheet glass: U.S. Pat. No. 3,338,696; U.S. Pat. No. 3,682,609; U.S. Pat. No. 3,437,470; U.S. Pat. No. 6,794,786; and Japanese Patent Publication No. 11-246230.

As briefly introduced above, the present invention provides a refractory ceramic body and a method for manufacturing an improved refractory ceramic body that, for example, can be useful as an isopipe in the manufacture of sheet glass. Specifically, the present invention provides an improved zircon composition and an isopipe formed from the inventive zircon composition. The isopipe of the present invention can have enhanced dimensional stability and longevity over conventional isopipes used in the manufacture of sheet glass.

Although the compositions, refractory bodies, and methods of the present invention are described below with respect to the manufacture of isopipes and sheet glass, it should be understood that the same or similar compositions and methods can be used in other applications where dimensionally stable refractory materials are required. Accordingly, the present invention should not be construed in a limited manner.

With reference to the drawings, FIG. 1 illustrates a schematic of an isopipe, typical of those used in the manufacture of sheet glass by, for example, the overflow downdraw fusion process. A conventional isopipe and sheet glass manufacturing system comprises a supply pipe 9 that provides molten glass to a collection trough 11 formed in a refractory body 13 known as an isopipe. During operation, molten glass can flow from the supply pipe to the trough where it can overflow the top of the trough of both sides, forming two sheets of glass that flow downward and then inward along the outer surfaces of the isopipe. The two sheets meet at the bottom or root 15 of the isopipe where they can fuse together into a single sheet. The single sheet is then fed to drawing equipment (represented by arrows 17), which controls the rate at which the sheet is drawn away from the root, and thus, the thickness of the sheet. The drawing equipment is typically positioned downstream of the root such that the formed sheet glass has sufficiently cooled and become rigid before contacting the equipment.

Conventional isopipes can be comprised of preformed, commercially available zircon materials (Ferro Corporation, Penn Yan, N.Y., USA). Commercially available zircon materials can be classified by particle size and utilized to form an isopipe. The conventional zircon material can be formed into a desired shape, such as an isopipe, and fired, producing a polycrystalline refractory ceramic body. A challenge in the formation of such a refractory ceramic body is achieving a dense structure that is resistant to creep. Creep, as used herein, refers to the tendency of a material to move or to deform to relieve a stress. Such deformation can occur as a result of long-term exposure to levels of stress that are below the yield or ultimate strength of the material and can be greater in materials that are subjected to heat for long periods of time. Lowering the creep rate of a refractory material such as, for example, an isopipe, can result in less sag during use. Creep rate can accelerate in low density or high grain-boundary refractory materials, such as those having large amounts of pores located at grain boundaries and/or triple points.

Creep can occur in various forms, such as Nabarro-Herring creep (stress driven bulk diffusion within grains) and/or Cobble creep (grain-boundary diffusion). Not wishing to be bound by theory, Nabarro-Herring creep can be related to the concentration and size of pores within a material, such as within and/or between grains of a ceramic, and can be proportional to grain size. A reduction in the concentration and/or size of pores between grains of a ceramic material can result in increased bulk density and increased creep resistance. Similarly, Cobble creep can be related to mass transport phenomena occurring along grain boundaries of a polycrystalline material, and can also be inversely related to grain size.

Conventional zircon refractory ceramics comprise zircon materials having large grain sizes so as to minimize grain boundaries, and thus Cobble creep. Use of zircon materials having a larger grain size can reduce the effects of Cobble creep, but can simultaneously result in an increase in the concentration and size of pores within the refractory body. Such an increase in the concentration and size of pores can result in decreased bulk density and decreased strength of an isopipe.

While increased density can improve the strength and performance of a refractory ceramic body, such as an isopipe, high density alone does not necessarily ensure adequate resistance to creep. To withstand the stresses and high temperatures of, for example, the glass forming process, for prolonged periods of time, a refractory ceramic body should also exhibit a low strain rate.

Conventional isopipes are typically prepared using zircon materials and can include substantial pores within their structure.

The present invention provides a composition having a fine zircon component, a medium zircon component, and a sintering aid, together with a method for manufacturing a refractory ceramic composite that exhibits a low strain rate. Zircon compositions in accordance with the present invention can provide refractory ceramic materials exhibiting few pores, high bulk densities, high strength, and low strain rates.

Zircon Components

The composition of the present invention, in one aspect, comprises a fine zircon component, a medium zircon component, and a sintering aid. The composition can optionally comprise a coarse zircon component. Each zircon component can have a median particle size and the particle size distributions of each component can overlap with the distributions of one or more other components. The distribution of zircon particle size modes in the composition can comprise discrete modes, such as, for example, a discrete bimodal composition, or a continuous mode, such as, for example, a continuous bimodal distribution. In one aspect, the distribution is a continuous bimodal distribution where the fine zircon component contributes a larger total volume fraction to the composition than the coarse component. The distribution of particle sizes in a composition can be measured and the particle size distribution of one or more zircon components analyzed using conventional de-convolution algorithms.

In various aspects, the fine zircon component can have a median particle size of less than 5 μm, the medium zircon component can have a median particle size of from 5 μm to 15 μm, and the optional coarse zircon component, if present, can have a median particle size greater than 15 μm. The median particle sizes and amounts of each zircon component can vary depending upon the desired porosity, bulk density, and strength of a refractory ceramic article made from the composition.

The fine zircon component of the present invention comprises, in various aspects, from greater than 0 to less than about 80 wt. %, for example, about 0.1, 0.5, 1, 2, 5, 10, 20, 30, 40, 44, 48, 50, 52, 55, 58, 60, 65, 70, 75, or 80 wt. % of the composition; from about 30 to about 70 wt. %, for example, about 30, 40, 44, 48, 50, 52, 55, 58, 60, 65, or 70 wt. % of the composition; or from about 40 to about 60 wt. %, for example, about 40, 44, 48, 50, 52, 55, 58, or 60 wt. % of the composition.

The fine zircon component of the present invention, in various aspects, has a median particle size of less than 5 μm, for example, about 4.9, 4.7, 4.3, 4.0, 3.7, 3.5, 3.1, 2.8, 2.8, 2.5, 2.0, 1.8, 1.5, 1.3, 1.0, 0.9, 0.7, 0.4, 0.2, or 0.1 μm. In other aspects, the fine zircon component has a median particle size of from less than 5 μm to about 0.1 μm, for example, about 4.9, 4.7, 4.3, 4.0, 3.7, 3.5, 3.1, 2.8, 2.8, 2.5, 2.0, 1.8, 1.5, 1.3, 1.0, 0.9, 0.7, 0.4, 0.2, or 0.1 μm; from about 3 μm to about 0.1 μm, for example, about 3.0, 2.8, 2.8, 2.5, 2.0, 1.8, 1.5, 1.3, 1.0, 0.9, 0.7, 0.4, 0.2, or 0.1 μm; or from 2 μm to about 0.1 μm, for example, about 2.0, 1.8, 1.5, 1.3, 1.0, 0.9, 0.7, 0.4, 0.2, or 0.1 μm. In a specific aspect, the fine zircon component has a median particle size of about 1 μm.

The medium zircon component of the present invention comprises, in various aspects, from greater than 0 to less than about 80 wt. %, for example, about 0.1, 0.5, 1, 2, 5, 10, 20, 30, 40, 44, 48, 50, 52, 55, 58, 60, 65, 70, 75, or 80 wt. % of the composition; from about 10 to about 70 wt. %, for example, about 10, 20, 30, 40, 44, 48, 50, 52, 55, 58, 60, 65, or 70 wt. % of the composition; or from about 20 to about 60 wt. %, for example, about 20, 30, 40, 44, 48, 50, 52, 55, 58, or 60 wt. % of the composition.

The medium zircon component of the present invention, in various aspects, has a median particle size of from 5 μm to 15 μm, for example, 5.0, 5.2, 5.5, 5.8, 6.0, 6.3, 6.7, 7.1, 7.5, 7.8, 8.0, 8.5, 9.0, 9.4, 9.8, 10.0, 10.6, 11.1, 11.7, 12.2, 12.6, 13.0, 13.5, 14.0, 14.6, or 15.0 μm. In other aspects, the medium zircon component has a median particle size of from 5 μm to about 10 μm, for example, 5.0, 5.2, 5.5, 5.8, 6.0, 6.3, 6.7, 7.1, 7.5, 7.8, 8.0, 8.5, 9.0, 9.4, 9.8, or 10.0 μm. In a specific aspect, the fine zircon component has a median particle size of about 7 μm.

The optional coarse zircon component of the present invention comprises, in various aspects when present, from greater than 0 to about 50 wt. %, for example, about 0.1, 0.5, 1, 2, 5, 10, 20, 30, 40, 44, 48, or 50 wt. % of the composition; or from about 10 to about 30 wt. %, for example, about 10, 12, 14, 18, 20, 22, 25, 27, or 30 wt. % of the composition. In a specific aspect, the coarse zircon component comprises about 20 wt. % of the composition.

The optional coarse zircon component of the present invention, in various aspects, has a median particle size of greater than 15 μm, for example, 15.1, 15.3, 15.7, 16.0, 16.5, 17.0, 17.7, 18.2, 19.3, 20.0, 20.4, 21.0, 21.5, 22.0, 22.6, 23.0, 23.4, 24.0, 24.5, 25, 28, 30, or 40 μm. In other aspects, the coarse zircon component has a median particle size of from greater than 15 μm to about 25 μm, for example, 15.1, 15.3, 15.7, 16.0, 16.5, 17.0, 17.7, 18.2, 19.3, 20.0, 20.4, 21.0, 21.5, 22.0, 22.6, 23.0, 23.4, 24.0, 24.5, or 25 μm. In a specific aspect, the optional coarse zircon component has a median particle size of about 20 μm.

The selection of particular zircon components and the amount of each component used in a composition can vary, provided that, when combined with a sintering aid and fired, the resulting refractory ceramic body has a strain rate of less than about $1 \times 10^{-6}$/hr.

In one aspect, the composition of the present invention comprises about 30 wt. % of a fine zircon component having a median particle size of about 1 μm, about 50 wt. % of a medium coarse component having a median particle size of about 7 μm, and about 20 wt. % of a coarse zircon component having a median particle size of about 20 μm. In another aspect, the composition comprises about 40 wt. % of a fine zircon component having a median particle size of about 1 μm, about 40 wt. % of a medium coarse component having a median particle size of about 7 μm, and about 20 wt. % of a coarse zircon component having a median particle size of about 20 μm. In another aspect, the composition comprises about 50 wt. % of a fine zircon component having a median particle size of about 1 μm, about 30 wt. % of a medium coarse component having a median particle size of about 7 μm, and about 20 wt. % of a coarse zircon component having a median particle size of about 20 μm. In yet another aspect, the composition comprises about 60 wt. % of a fine zircon component having a median particle size of about 1 μm, about 20 wt. % of a medium coarse component having a median particle size of about 7 μm, and about 20 wt. % of a coarse zircon component having a median particle size of about 20 μm.

The distribution of particle sizes within each component is not required to be uniform. For example, a zircon composition can comprise a coarse, a medium, and a fine particle size zircon component. The coarse zircon component can comprise a distribution wherein about 90 wt. % of the coarse component has a particle size from greater than about 15 μm to about 25 μm, and wherein about 10 wt. % of the coarse component has a particle size greater than about 25 μm. The fine zircon component can comprise a distribution wherein about 90 wt. % of the fine zircon component has a particle size from greater than about 0.8 μm to about 1.6 μm, and wherein about 10 wt. % of the fine zircon component has a particle size greater than about 1.6 μm.

Individual zircon components can be purchased commercially (Ferro Corporation, Penn Yan, N.Y., USA) or prepared from other zircon materials by, for example, grinding a commercially available zircon material to a target median particle size. Such zircon components can be ground by any method suitable for providing the desired median particle size and distribution. In one aspect, a commercially available zircon material is ball-milled with yttria-stabilized zirconia grinding media to a desired median particle size. Components can be further ground, if required, by wet-grinding in a solvent, such as, for example, methanol.

The particle size distribution of a zircon component can vary depending upon the type and extent of grinding. For example, moderate grinding to a median particle size greater than about 2 μm can provide a broad particle size distribution, whereas grinding to a median particle size of about 1 μm can provide a narrow particle size distribution.

A zircon material can also be classified and/or separated into one or more particle size fractions by, for example, sieving a ground zircon component. Grinding and particle sizing techniques are known and one of skill in the art could readily select an appropriate zircon material and grinding technique.

Sintering Aid

The composition of the present invention comprises at least one sintering aid. The sintering aid can be, in various aspects, from about 0.05 to about 5 wt. % of the composition, or 0.1, 0.2, 0.5, 0.9, 1, 1.3, 1.8, 2, 2.5, 3, 4, or 5 wt. % of the composition; or from about 0.1 to about 0.6 wt. %, for example, about 0.1, 0.2, 0.3, 0.4, 0.5, or 0.6 wt. % of the composition. In various specific aspects, the composition comprises 0.2 wt. % or 0.4 wt. % of a sintering aid.

Sintering aids can comprise any material capable of mineralizing zircon, such as, for example, oxides and/or salts of titanium, iron, calcium, yttrium, niobium, neodymium, glass compounds, or a combination thereof, provided that, when contacted and/or mixed with the zircon components and fired, the resulting refractory ceramic body has a strain rate of less than about $1 \times 10^{-6}$/hr. In one aspect, the sintering aid is a titanium containing compound. In a specific aspect, the sintering aid is a titanium dioxide. The use of and amount of a particular sintering aid can vary depending upon, for example, the size and mixture of zircon components and the method utilized for forming the composition into a desired shape. If a sintering aid does not yield a fired article having a strain rate of less than about $1 \times 10^{-6}$/hr, the amount and/or composition of the zircon components and/or the sintering aid can be varied, such as, for example, by using a titanium containing sintering aid and/or increasing the concentration of the fine zircon component in the composition.

One or more sintering aids of the same or different compositions can be used. A sintering aid can be contacted with and/or mixed with the zircon components using any suitable method. In one aspect, the sintering aid is dry blended with the zircon components and isopressed. In another aspect, the sintering aid is mixed with the zircon components as a slurry, ball-milled to homogenize the resulting mixture, dried, and isopressed. The isopressed material can subsequently be fired to produce a cured ceramic article. In one aspect, the sintering aid is added to the zircon components in a highly dispersed form. In another aspect, the mixture of sintering aid and zircon components is processed to achieve a uniform distribution of the sintering aid and zircon components. A highly dispersed and/or uniformly mixed sintering aid can improve the density and/or strain rate of a subsequently fired ceramic article. A composition comprising a highly dispersed sintering aid can achieve a target density and/or strain rate using significantly less sintering aid than a similar composition comprising a poorly dispersed sintering aid. Sintering aids are commercially available (Sigma-Aldrich, St. Louis, Mo., USA) and one of skill in the art could readily select an appropriate sintering aid for a desired composition or ceramic article.

Zircon/Sintering Aid Composition

The components (i.e., zircon components and sintering aid) of the composition can be mixed by any suitable method, such as, for example, dry blending. It is preferable that the components of the composition be uniformly or substantially uniformly mixed. Uniform mixtures of multiple components can provide ceramic articles having higher bulk densities, greater strength, and reduced strain. Such uniform mixtures can be achieved using conventional mixing and dispersion techniques. Mixing and/or dispersion of components can be performed by, for example, a high shear mixer such as a ball mill, an attrition mill, and/or a hammer mill. An exemplary mixing process can be performed with a Processall® mixer, available from Processall Incorporated, Cincinnati, Ohio, USA. A high shear mixer, such as a Processall mixer, is preferred in order to obtain a homogeneous blend of components. In one aspect, the multiple components are mixed to provide a substantially homogeneous mixture. Such a homogeneous mixture can comprise a uniform or substantially uniform distribution of, for example, coarse, medium, and fine zircon components and a sintering aid. Various mixing and dispersion techniques are known in the ceramics and fine particle industry and one of skill in the art could readily select an appropriate mixing and/or dispersion technique.

In one aspect, the composition of the present invention comprises about 30 wt. % of a fine zircon component having a median particle size of about 1 μm, about 49.8 wt. % of a medium coarse component having a median particle size of about 7 μm, about 19.8 wt. % of a coarse zircon component having a median particle size of about 20 μm, and about 0.4 wt. % of a $TiO_2$ sintering aid. In another aspect, the composition comprises about 40 wt. % of a fine zircon component having a median particle size of about 1 μm, about 39.9 wt. % of a medium coarse component having a median particle size of about 7 μm, about 19.9 wt. % of a coarse zircon component having a median particle size of about 20 μm, and about 0.2 wt. % of a $TiO_2$ sintering aid.

Forming and Firing a Ceramic Article

After mixing, a composition can be formed into a green body of any desired shape, such as an isopipe, by a suitable technique, such as, for example, slip casting, extrusion, isostatic pressing, and/or injection molding. A green body, as used herein, comprises a formed, but unfired ceramic material. Depending on the specific forming technique employed, liquids, solvents, and/or forming aids can optionally be mixed with the zircon composition to facilitate the forming process. Such liquids, solvents, and/or forming aids, if present, can comprise any material suitable for facilitating the forming process. In one aspect, the liquid, solvent, and/or forming aid, if present, comprises at least one of methyl cellulose, water, glycerol, or a combination thereof. These liquids, solvents, and/or forming aids can be removed prior to or during the firing process or can remain in an article after firing. In one aspect, a slip casting technique is utilized to form a high liquid content mixture comprising the composition into a desired shape. In another aspect, an extrusion technique is utilized to form the composition into a desired shape. In yet another aspect, an isostatic pressing technique is utilized to form a dry or substantially dry composition into a desired shape. In an exemplary isostatic pressing technique, the pre-fired composition is optionally subjected to a tapping and/or vacuum step to achieve a high degree of compaction at ambient conditions, and then is isostatically pressed at about 18,000 psi for a period of from about 5 to about 20 minutes. Forming techniques are known in the ceramic industry and one of skill in the art could readily select an appropriate forming technique for a desired ceramic article.

Thereafter, the refractory can be prepared in accordance with techniques currently known in the art of with improved techniques which may be developed in the future. The refractory can be fired to sinter at least a portion of the zircon components of the composition. A firing step can comprise heating the formed green body at a time and temperature suitable to form a stable refractory ceramic body. In one aspect, the firing step can comprise heating a formed green body in an electrical furnace at a temperature of from about 1,400° C. to about 1,650° C. for a period of from about 1 to about 48 hours. In another aspect, the firing step can comprise heating a formed green body in an electrical furnace at a temperature of from about 1,400° C. to about 1,600° C. for a period of from about 2 to about 24 hours. The firing step can be performed in an air atmosphere, under an inert atmosphere, such as helium, or under vacuum. Firing techniques for refractory ceramics are known and one of skill in the art would readily be able to select and perform an appropriate firing step for a refractory ceramic composition of the present invention.

Fired Refractory Ceramic Body

A fired refractory ceramic body prepared from the composition and method of the present invention can exhibit low porosity, high bulk density, and low strain. Depending on the specific zircon composition, degree of mixing, forming and firing technique, a refractory ceramic body prepared in accordance with the present invention can, in various aspects, comprise a bulk density greater than about 4.25 g/cc, 4.3 g/cc, 4.4 g/cc, 4.5 g/cc, or more. The theoretical maximum bulk density for a zircon article is about 4.63 g/cc. Thus, it is possible to achieve bulk density values of, for example, 90%, 92%, 94%, or 96% of the theoretical maximum.

The strength of resulting refractory ceramic body and its resistance to creep and/or sag is dependent, in part, on the amount of pore space remaining in the refractory ceramic body. A refractory ceramic body having less pore space volume within its structure will generally exhibit a greater resistance to creep than a body with greater pore space volume. Zircon refractory ceramic bodies prepared in accordance with the present invention can have porosity values less than about 25%, less than about 12%, less than 10%, or less than about 3%.

The strength of a refractory ceramic body can be ascertained by determining the modulus of rupture (MOR) by, for example, ASTM C158. MOR refers to the amount of force needed to break a test sample and is usually expressed in pounds of force per square inch. The MOR of zircon refractory ceramic articles prepared in accordance with the present invention can be greater than about $10 \times 10^3$ psi, greater than about $15 \times 10^3$ psi, or greater than about $20 \times 10^3$ psi. Such high strength (MOR) provides increased creep resistance to an article, such as an isopipe, during operation.

Increasing the density of a refractory ceramic body can improve sag and/or creep resistance, but further improvements can be made if the refractory ceramic body exhibits a low strain rate. A ceramic body having a reduced strain rate can be prepared with the zircon components and sintering aid of the present invention. The strain rate of a refractory ceramic body prepared in accordance with various aspects of the present invention can be less than about $1.0 \times 10^{-6}$/hr, for example, about 8.5, 7.1, 6.4, 5.8, 5.5, 5.1, 4.8, 4.4, 4.3, or $3.8 \times 10^{-7}$/hr. In one aspect, the strain rate of a refractory ceramic body prepared in accordance with the present invention can be less than about 50%, or less than about 25% of the strain rate of a conventional (isopressed) zircon isopipe.

Although several aspects of the present invention have been illustrated in the accompanying drawings and described in the detailed description, it should be understood that the invention is not limited to the aspects disclosed, but is capable of numerous rearrangements, modifications and substitutions without departing from the spirit of the invention as set forth and defined by the following claims.

EXAMPLES

To further illustrate the principles of the present invention, the following examples are put forth so as to provide those of ordinary skill in the art with a complete disclosure and description of how the articles, devices, and methods claimed herein are made and evaluated. They are intended to be purely exemplary of the invention and are not intended to limit the scope of what the inventors regard as their invention. Efforts have been made to ensure accuracy with respect to numbers (e.g., amounts, temperatures, etc.); however, some errors and deviations should be accounted for. Unless indicated otherwise, temperature is ° C. or is at ambient temperature, and pressure is at or near atmospheric. There are numerous variations and combinations of process conditions that can be used to optimize product quality and performance. Only reasonable and routine experimentation will be required to optimize such process conditions.

Example 1

Preparation of Zircon Compositions

In a first example, a series of zircon compositions were prepared by mixing zircon materials of varying particle sizes, as detailed in Table 1, below. Samples are identified by the weight percents of each component, followed by the median particle size of each component (e.g., sample F comprises 10 wt. % of a coarse zircon component having a median particle size of 20 μm, 50 wt. % of a medium zircon component having a median particle size of 7 μm, 40 wt. % of a fine zircon component having a median particle size of 1 μm, and 0.20 wt. % of a TiO$_2$ sintering aid). Isopropyl alcohol was then added to each mixture to form slurries, which were then shear-mixed by ball milling for 2 hours. Sample B represents a comparative 7 μm zircon sample without a fine particle size zircon component. Each composition was dried, isopressed and fired at approximately 1,580° C. The density of each dried, isopressed, and fired sample are detailed in Table 1.

TABLE 1

Density of Zircon Compositions

| Sample | Composition | Sintering Aid | Density, g/cc |
|---|---|---|---|
| A | Commercial Zircon | 0.4 wt. % TiO$_2$ | 4.1 |
| B | 7 μm | none | 3.84 |
| C | 50/50 7:1 μm | none | 4.22 |
| D | 50/50 7:1 μm | 0.4 wt. % TiO$_2$ | 4.58 |
| E | 10/45/45 20:7:1 μm | none | 4.29 |
| F | 10/50/40 20:7:1 μm | 0.2 wt. % TiO$_2$ | 4.44 |
| G | 20/60/20 20:7:1 μm | 0.4 wt. % TiO$_2$ | 4.23 |
| H | 20/50/30 20:7:1 μm | 0.2 wt. % TiO$_2$ | 4.25 |
| I | 20/40/40 20:7:1 μm | 0.2 wt. % TiO$_2$ | 4.24 |
| J | 20/40/40 20:7:1 μm | 0.4 wt. % TiO$_2$ | 4.41 |
| K | 20/30/50 20:7:1 μm | 0.2 wt. % TiO$_2$ | 4.36 |
| L | 20/30/50 20:7:1 μm | 0.2 wt. % TiO$_2$ | 4.41 |
| M | 20/30/50 20:7:1 μm | 0.4 wt. % TiO$_2$ | 4.57 |
| N | 20/30/50 20:7:1 μm | 0.2 wt. % ZnO | 4.29 |
| O | 20/20/60 20:7:1 μm | 0.4 wt. % TiO$_2$ | 4.62 |

The density values listed in Table 1 illustrate the increased density obtainable with the use of fine, medium, and optional coarse zircon components and/or sintering aids. The density of Samples D, M, and O approach the theoretical maximum density for zircon of 4.63 g/cc, while the commercial zircon and single particle size zircon of samples A and B, respectively, have significantly lower densities. The improved density achievable with addition of a sintering aid is illustrated in the comparison of samples C and D.

Example 2

Improved Strain Rate of Zircon Articles

In a second example, the strain rate of samples prepared in Example 1 were determined at 1,000 psi, 1,180° C., over 100 hours. The strain rate results are detailed in Table 2, below.

TABLE 2

Strain Rate of Zircon Samples

| Sample | Composition | Sintering Aid | Strain Rate/hr |
|---|---|---|---|
| A | Commercial Zircon | 0.4 wt. % TiO$_2$ | $1.06 \times 10^{-6}$ |
| B | 7 μm | none | $5.9 \times 10^{-6}$ |
| C | 50/50 7:1 μm | none | $1.30 \times 10^{-6}$ |
| D | 50/50 7:1 μm | 0.4 wt. % TiO$_2$ | $4.21 \times 10^{-7}$ |
| E | 10/45/45 20:7:1 μm | none | $1.60 \times 10^{-6}$ |
| F | 10/50/40 20:7:1 μm | 0.2 wt. % TiO$_2$ | $8.20 \times 10^{-7}$ |
| G | 20/60/20 20:7:1 μm | 0.4 wt. % TiO$_2$ | $5.97 \times 10^{-7}$ |
| H | 20/50/30 20:7:1 μm | 0.2 wt. % TiO$_2$ | $5.75 \times 10^{-7}$ |
| I | 20/40/40 20:7:1 μm | 0.2 wt. % TiO$_2$ | $8.43 \times 10^{-7}$ |
| J | 20/40/40 20:7:1 μm | 0.4 wt. % TiO$_2$ | $4.34 \times 10^{-7}$ |
| K | 20/30/50 20:7:1 μm | 0.2 wt. % TiO$_2$ | $4.32 \times 10^{-7}$ |
| L | 20/30/50 20:7:1 μm | 0.2 wt. % TiO$_2$ | $4.88 \times 10^{-7}$ |
| M | 20/30/50 20:7:1 μm | 0.4 wt. % TiO$_2$ | $4.34 \times 10^{-7}$ |
| N | 20/30/50 20:7:1 μm | 0.2 wt. % ZnO | $5.13 \times 10^{-6}$ |
| O | 20/20/60 20:7:1 μm | 0.4 wt. % TiO$_2$ | $4.84 \times 10^{-7}$ |

As illustrated in Table 2, the strain rate of a zircon composition prepared in accordance with the present invention, such as sample D, can have a strain rate of about 36.8% less than that of a sample prepared with a standard commercially available zircon alone. Sample E did not contain a sintering aid and exhibited a strain rate equivalent to, or higher than a commercial zircon material. Similarly, Sample N contained 0.2 wt. % ZnO, but did not contain a sintering aid in accordance with the present invention. Despite a high density (4.29 g/cc), Sample N exhibited a strain rate over an order of magnitude greater than a similar sample (Sample M) that contained 0.4 wt. % TiO$_2$, in accordance with the present invention. The effect of varying amounts of sintering aid is illustrated in Samples I and J, where the strain rate was reduced by approximately 50% with the use of a larger quantity of TiO$_2$ sintering aid.

Various modifications and variations can be made to the compositions, articles, devices, and methods described herein. Other aspects of the compositions, articles, devices, and methods described herein will be apparent from consideration of the specification and practice of the compositions, articles, devices, and methods disclosed herein. It is intended that the specification and examples be considered as exemplary.

What is claimed is:

1. A method for making a green body comprising:
   a) forming a mixture including:
      i) about 10 wt. % to 60 about wt. % of a fine zircon component having a median particle size of less than 5 μm,
      ii) about 10 wt. % to about 60 wt. % of a medium zircon component having a median particle size of from 5 μm to 15 μm, and iii) a sintering aid; and then b) forming the mixture into a desired shape.

2. The method of claim 1, wherein the mixture formed in step a) further comprises a coarse zircon component having a median particle size of greater than 15 μm.

3. The method of claim 1, wherein the sintering aid comprises at least one oxide or salt of titanium, iron, calcium, yttrium, niobium, neodymium, or a combination thereof.

4. The method of claim 1, wherein the step b) comprises an isostatic pressing process.

5. The method of claim 1, further comprising a step of c) firing the desired shape at a time and temperature sufficient to form an article having a strain rate of less than about $1 \times 10^{-6}$/hr.

6. The method of claim 1, wherein step a) further comprises, contacting at least one of the fine zircon component, the medium zircon component, or the sintering aid with at least one of methyl cellulose, water, glycerol, or a combination thereof.

7. A ceramic green body made by the method of claim 4.

8. The method of claim 1, wherein step a) comprises forming a mixture including:
   i) about 10 wt. % to 60 about wt. % of a fine zircon component having a median particle size of from about 0.1 μm to about 2 μm,
   ii) about 10 wt. % to about 60 wt. % of a medium zircon component having a median particle size of from 5 μm to 15 μm, and
   iii) a sintering aid.

9. The method of claim 2, wherein the sintering aid comprises a titanium containing compound.

10. The method of claim 2, wherein the sintering aid is from greater than 0 wt. % to about 1 wt. % of the composition.

11. The method of claim 2, wherein the sintering aid is from greater than 0 wt. % to about 0.5 wt. % of the composition.

12. The method of claim 2, wherein the fine zircon component comprises from about 40 wt. % to about 60 wt. % of the composition.

13. The method of claim 2, wherein the fine zircon component has a median particle size of from about 0.1 μm to about 2 μm and the coarse zircon component has a median particle size of from 15 μm to about 25 μm.

14. The method claim 8, wherein the fine zircon component comprises from about 40 wt. % to about 60 wt. % of the composition; and the mixture formed in step a) further includes a coarse zircon component having a median particle size of from 15 μm to about 25 μm; and wherein the sintering aid comprises from greater than 0 wt. % to about 0.5 wt. % of the composition and comprises a titanium containing compound.

15. The article method of claim 5, having a bulk density of greater than about 4.25 g/cc.

16. The method of claim 5, wherein step b) comprises forming the mixture into the shape of an isopipe, and in step c) the ceramic article is an isopipe.

17. The method of claim 2, wherein in step a) at least the fine zircon component, the medium zircon component, and the sintering aid are substantially uniformly mixed.

18. The method of claim 16, wherein the isopipe has a strain rate of less than about $1 \times 10^{-6}$/hr.

* * * * *